(12) United States Patent
Scholz et al.

(10) Patent No.: US 10,284,700 B2
(45) Date of Patent: *May 7, 2019

(54) METHOD FOR DATA COMMUNICATION IN A VEHICLE AND DATA COMMUNICATION DEVICE

(71) Applicant: VOLKSWAGEN AG, Wolfsburg (DE)

(72) Inventors: Lars Scholz, Braunschweig (DE); Martin Fesefeldt, Hannover (DE); Martin Wuschke, Meine (DE)

(73) Assignee: VOLKSWAGEN AG, Wolfsburg (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/873,395

(22) Filed: Oct. 2, 2015

(65) Prior Publication Data
US 2016/0028868 A1 Jan. 28, 2016

Related U.S. Application Data

(63) Continuation of application No. 14/112,159, filed as application No. PCT/EP2012/001228 on Mar. 21, 2012, now Pat. No. 9,172,785.

(30) Foreign Application Priority Data

Apr. 16, 2011 (DE) .......... 10 2011 017 332

(51) Int. Cl.
*H04M 1/60* (2006.01)
*G01C 21/26* (2006.01)
(Continued)

(52) U.S. Cl.
CPC .......... *H04M 1/6091* (2013.01); *G01C 21/26* (2013.01); *H04L 12/40006* (2013.01);
(Continued)

(58) Field of Classification Search
CPC ..... H04W 4/046; H04W 12/08; H04W 4/008; H04W 12/06; H04L 12/4625; H04L 67/12;
(Continued)

(56) References Cited

U.S. PATENT DOCUMENTS 6,801,942 B1 10/2004 Dietrich et al.
7,209,813 B2 4/2007 Namaky
(Continued)

FOREIGN PATENT DOCUMENTS

CN 101484779 A 7/2009
CN 201726430 U 1/2011
(Continued)

OTHER PUBLICATIONS

International Search Report, dated Jul. 30, 2012, issued in corresponding International Patent Application No. PCT/EP2012/001228.
(Continued)

*Primary Examiner* — George Eng
*Assistant Examiner* — Jing Gao
(74) *Attorney, Agent, or Firm* — Hunton Andrews Kurth LLP

(57) ABSTRACT

A method for data communication in a vehicle between an in-vehicle device and a mobile device coupled with the vehicle includes transmitting, by the in-vehicle device, data via a data bus of the vehicle to an in-vehicle data communication device, a first data protocol being used for this purpose, in which an arbitration occurs. The data communication device converts the data, and the data communication device transmits the converted data via a data link to the mobile device. A second data protocol is used in the data transmission from the in-vehicle data communication device to the mobile device, in which no arbitration occurs. A data (Continued)

communication device by which the method of the invention may be implemented is also described.

16 Claims, 2 Drawing Sheets

(51) Int. Cl.
    *H04L 12/40*     (2006.01)
    *H04L 12/413*     (2006.01)
    *H04L 12/46*     (2006.01)
    *H04L 29/08*     (2006.01)
    *H04L 29/06*     (2006.01)

(52) U.S. Cl.
    CPC ...... *H04L 12/4135* (2013.01); *H04L 12/4625* (2013.01); *H04L 67/12* (2013.01); *H04L 69/08* (2013.01); *H04L 69/18* (2013.01); *H04L 2012/40273* (2013.01)

(58) Field of Classification Search
    CPC ........... H04L 69/18; H04L 2012/40273; H04L 69/08; H04L 12/0006; H04L 12/4135; H04M 1/6091; G01C 21/26
    USPC ........................................................ 455/434
    See application file for complete search history.

(56) References Cited

U.S. PATENT DOCUMENTS

| | | |
|---|---|---|
| 7,552,009 B2 | 6/2009 | Nelson |
| 8,244,307 B1 | 8/2012 | Tilgner et al. |
| 2005/0130723 A1 | 6/2005 | Grivas et al. |
| 2006/0224305 A1 | 10/2006 | Ansari et al. |
| 2008/0261525 A1* | 10/2008 | Matsuo ................. H04W 76/02 455/41.2 |
| 2009/0197593 A1* | 8/2009 | Farrell ................... G08G 1/205 455/426.1 |
| 2009/0287412 A1 | 11/2009 | Menzel et al. |
| 2009/0298482 A1 | 12/2009 | Yen et al. |
| 2011/0069718 A1* | 3/2011 | Morris ............. H04L 12/40143 370/419 |

FOREIGN PATENT DOCUMENTS

| | | | |
|---|---|---|---|
| DE | 199 21 533 | 1/2001 | |
| DE | 10 2008 012 749 | 9/2009 | |
| WO | WO 2007/030267 | 3/2007 | |
| WO | WO 2007030267 A1 * | 3/2007 | |
| WO | WO 2008/091727 | 7/2008 | |
| WO | WO 2008091727 A1 * | 7/2008 | ......... B60R 11/0252 |

OTHER PUBLICATIONS

Written Opinion, dated Jul. 30, 2012, issued in corresponding International Patent Application No. PCT/EP2012/001228.
German Search Report, dated Jul. 27, 2011, issued in German Patent Application No. 10 2011 017 332.3.

* cited by examiner

METHOD FOR DATA COMMUNICATION IN A VEHICLE AND DATA COMMUNICATION DEVICE

CROSS-REFERENCE TO RELATED APPLICATIONS

This application is a continuation of U.S. patent application Ser. No. 14/112,159 filed on Dec. 21, 2013, which is a national phase of International Application No. PCT/EP2012/001228 filed on Mar. 21, 2012, which claims priority to German Patent Application No. 10 2011 017 332.3 filed on Apr. 16, 2011, each of which is expressly incorporated herein in its entirety by reference thereto.

FIELD OF INVENTION

The present invention relates to a method for data communication in a vehicle between an in-vehicle device and a mobile device coupled to the vehicle. In the method, the in-vehicle device transmits data via a data bus of the vehicle to an in-vehicle data communication device, a first data protocol being used for this purpose, in which an arbitration occurs. The data communication device then converts the data and transmits the converted data via a data link to the mobile device. The present invention furthermore relates to a data communication device by which this method may be implemented. The data communication device is provided in the vehicle and is provided for the data communication between the in-vehicle device and the mobile device coupled to the vehicle. It includes a first interface for receiving data from the in-vehicle device via a data bus of the vehicle, a first data protocol being used for this purpose, in which an arbitration occurs. It furthermore has a converter for converting the received data and a second interface for transmitting the converted data via a data link to the mobile device.

BACKGROUND INFORMATION

When coupling mobile devices with devices of the vehicle, it is necessary to use compatible data protocols that make it possible for the in-vehicle device to process the data received from the mobile device and conversely for the mobile device to process the data of the in-vehicle device. When coupling a mobile navigation device with the vehicle, it is known for example to couple the mobile navigation system with in-vehicle devices via the interface for an automotive diagnostic system (the so-called OBD-II jack). Vehicle-specific information is supplied to the mobile navigation device via this interface, in particular information relevant to the environment. This information may be used for a fuel-optimized navigation function of the mobile navigation device.

German Application No. DE 199 21 533 describes a communication system of a motor vehicle. This communication system includes a mobile telephone and an audio and/or information system, which is installed in the motor vehicle and which includes a receiving device and an acoustic output unit as well as a microphone for implementing a hands-free speaking function. The communication system allows for a voice and/or data transmission between the mobile telephone and the audio and/or information system via a wireless link. Telephone calls received by the mobile telephone are able to be output via the acoustic output unit. The communication between the mobile telephone and the audio and/or information system installed in the motor vehicle occurs via a second radio link, which is developed as a bidirectional short-distance link. The communication between the system installed in the motor vehicle and the mobile telephone makes it possible to operate the mobile telephone via operating elements of a radio of the vehicle for example. The mobile telephone may furthermore be used as a remote control for the radio. Finally, other vehicle functions, which are connected via a suitable bus, may also be controlled by the mobile telephone.

SUMMARY

An objective of the present invention is to provide a method and a device of the kind mentioned at the outset, which allows for data communication between the mobile device and an in-vehicle device, it being possible to use already existing and possibly standardized communication protocols for this purpose.

The method according to the present invention includes a second data protocol that may be used in the data transmission from the in-vehicle data communication device to the mobile device, in which no arbitration occurs.

An in-vehicle device according to the present invention may be permanently installed in the vehicle. It may be removed only by a tool, for example. In-vehicle devices may include, for example, the various devices of the electronic system of the vehicle, in particular information and infotainment systems and driver assistance systems, such as an electronic parking assistant, for example.

A mobile device coupled with the vehicle according to the present invention may not be permanently installed in the vehicle, but typically may be manually disconnected from the vehicle by the user and may be mechanically connected to the vehicle. A physical connection to the vehicle, however, is not necessary. With mobile devices, it often suffices for the device to be located within the vehicle and to be coupled with the vehicle only for data exchange. Such a mobile device may be, in particular, a mobile navigation system, a mobile telephone or a so-called PDA (personal digital assistant).

An arbitration in data communication may be a process of solving data access conflicts or data access collisions. Data may be prioritized, for example, such that the sequence of processing the transmitted data is defined. The method according to the present invention may use data protocols with arbitration and without arbitration. For this purpose, the in-vehicle data communication between the in-vehicle device and the in-vehicle data communication device via the data bus of the vehicle may be arbitrated such that conventional bus systems may be used in vehicles. In the data transmission to the mobile device, by contrast, a different data protocol may be used, in which no arbitration occurs. In this manner, the data communication with the mobile device may be simplified and adapted to interfaces as are common outside of the use in vehicles. For example, interfaces may be used, which are used in consumer electronics or mobile telephone technology. A method is thus advantageously provided, in which different, already existing and possibly standardized communication protocols may be used and combined. This facilitates the use of external devices from consumer electronics and of add-on devices for vehicles. In particular, an exchange of data may be made possible between the external mobile device, which is coupled with the vehicle for data exchange, and in-vehicle devices.

The data communication device may convert the data received via the data bus of the vehicle into a data format for an asynchronous serial interface for the purpose of transmitting data using the second data protocol. Such an interface is very common in electronic devices outside of the vehicle, which means that the conversion of the data for this interface facilitates the connection of electronic devices that have no special adaptations to the vehicle electronic system.

The data communication device may filter the data received via the vehicle bus prior to transmitting the converted data to the mobile device. Normally, a multitude of data are transmitted via the data bus of the vehicle, which are not relevant for the mobile device. It is therefore not necessary for the mobile device to be able to access these data. The filtering thus significantly reduces the quantity of data transmitted to the mobile device. On the other hand, however, the data relevant overall or temporarily for the mobile device may be extracted and transmitted to the mobile device in a converted state. This additionally provides a firewall function.

The data link between the data communication device and the mobile device may be in particular a serial point-to-point connection. In such a point-to-point connection, an arbitration is advantageously not necessary. Data relevant for the mobile device are transmitted directly from the data communication device to the mobile device. Conversely, the mobile device is able to transmit data directly to the data communication device so that they may be processed by in-vehicle devices.

The data link between the mobile device and the data communication device may be a conventional wired connection for example. A short-range radio link may also be established, however, for example, a Bluetooth or WLAN link. This allows for common interfaces of mobile devices to be used for the communication with devices of the vehicle.

The data in the second data protocol may be transmitted in packets, the length of a data packet being greater than 8 bytes and smaller than 255 bytes. In the case of the second data protocol, one is thus advantageously not limited to data packets of 8 bytes, as are used for example in the data transmission over data buses of the vehicle. This makes it possible to design the data transmission between the in-vehicle data communication device and the mobile device in a more flexible manner.

An authentication code may be transmitted to the mobile device when transmitting data from the in-vehicle data communication device to the mobile device. The mobile device is thus able to ensure that it has indeed received data from an internal device of a vehicle or a specific internal device of the vehicle.

It is furthermore possible to encrypt the data transmission between the data communication device and the mobile device. This ensures the security of the data transmission and prevents the data communication from being read by unauthorized third parties. Alternatively, the protocol definition may also prevent free access or reading by third parties.

The data transmission between the in-vehicle data communication device and the mobile device may occur, in particular, bidirectionally. This allows for audio source control, for example. Audio data of the mobile device may be converted via the loudspeakers installed in the vehicle, for example, it being possible for the in-vehicle devices to perform an audio priority management and/or provide a visual representation of the state of the audio output. Conversely, it is also possible to use the audio output of the mobile device to output data from audio sources of in-vehicle devices. The audio output in this instance may be controlled by an in-vehicle device and/or by the mobile device.

When transmitting data between the in-vehicle device and the mobile device, it is furthermore possible to transmit specification information of the mobile device to the in-vehicle data communication device and/or to transmit specification information of the data communication device to the mobile device. This makes it possible to test the mutual compatibility of the respective hardware and software. In addition, adaptations to the utilized hardware and/or software may be performed, thus avoiding errors of applications which use both in-vehicle devices as well as the mobile device.

The data bus of the vehicle may be in particular the CAN (controller area network) bus of the vehicle. A common standardized data protocol is thus used for the communication between the in-vehicle devices and the in-vehicle data communication device. The data communication device may convert the data received via the CAN bus into an intermediate data format. Following the data transmission to the mobile device, the latter converts the data received from the data communication device into a data format for the asynchronous serial interface. To be sure, the data conversion via the intermediate data format requires another data conversion in the mobile device. However, this yields the following advantages: in the data conversion in the in-vehicle data communication device, a data structure remains intact, which allows the use of existing development tools for simulation and error debugging. These developmental tools are already used in the analysis of the data transmission via the CAN bus. They may also be used in the method of the present invention for verifying the data communication with the mobile device. The data structures that are not required for this purpose, however, such as in particular arbitration, do not have to be used in the data transmission to the mobile device so that the expenditure for data conversion in the mobile device is reduced. No special development tools are thus required for the analysis of the data communication with the mobile device.

In particular, audio data may be transmitted from the mobile device to the data communication device and may be output by the data communication device possibly via another in-vehicle device.

The data communication device according to the present invention may include a converter that is able to convert the data for the data transmission to the mobile device into a second data protocol, in which no arbitration occurs. The data communication device according to the present invention may be used in particular for implementing the method of the present invention. Consequently, it offers the same advantages as the method of the present invention.

The in-vehicle data communication device may be comprised in particular by a radio. Such a radio is normally provided in most motor vehicles. In the device according to the present invention, it thus assumes the function of a central interface in the vehicle, which provides for the data communication with mobile devices. The mobile device is in particular a mobile navigation device. The data communication device may furthermore include a CD drive or other multimedia or infotainment devices.

The data communication device according to the present invention may thus provide for an interface between the radio of the vehicle manufacturer and for example a mobile navigation device for end users, which is not permanently installed in the vehicle. A fully functional radio-navigation system may be provided in this manner, which is cost-effective and in which the mobile navigation device may be updated simply and cost-effectively and adapted to further developments in this area. The development cycles of radio-navigation systems may be shortened in this manner.

In the method and data communication device according to the present invention, it may also be possible to use again existing data protocols and thus also existing development tools in the development process. This simplifies the development of the radio-navigation system. Moreover, this makes it possible to save development costs. It is furthermore possible to combine the manifold functions of the control units in the vehicle with the mobile device into one overall system without having to adapt the control units of the vehicle or their software. For this purpose, data obtained in the vehicle and operating elements of the vehicle may be used to extend and improve the functionality of the mobile device, in particular of the mobile navigation device.

Exemplary embodiments of the present invention will now be described with reference to the accompanying drawings.

DETAILED DESCRIPTION

Figure 1:
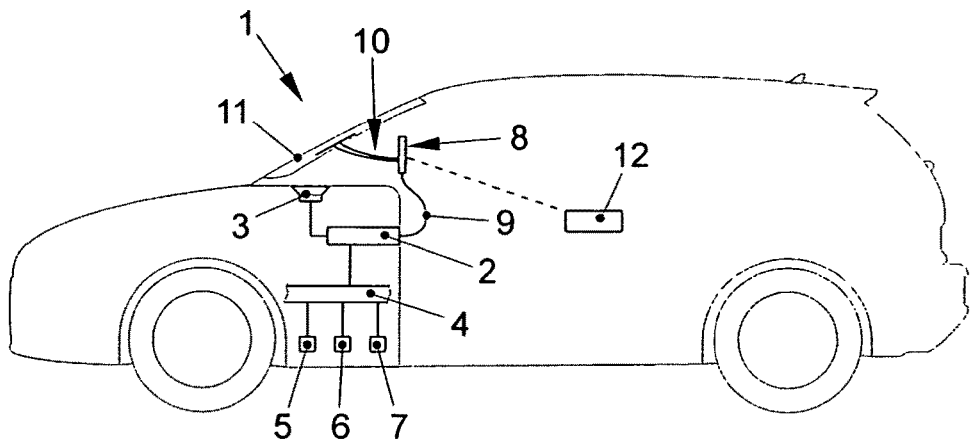
FIG. 1 shows schematically a motor vehicle having a data communication system, which uses one exemplary embodiment of the data communication device according to the present invention.
Figure 2:
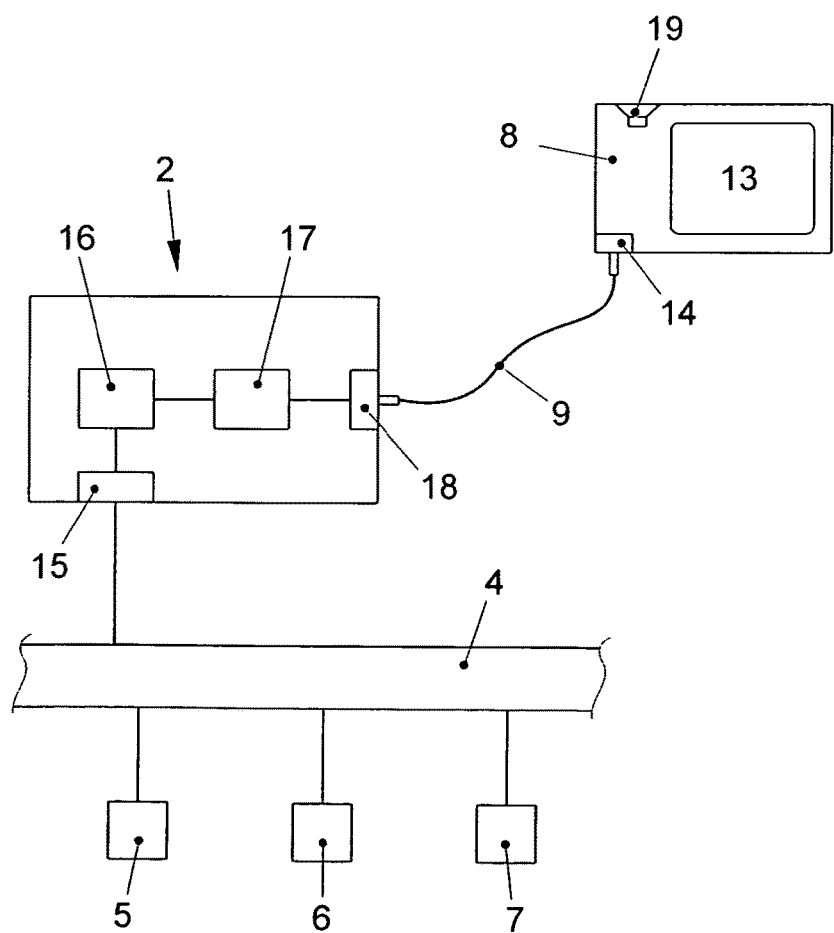
FIG. 2 shows an exemplary embodiment of the data communication device and its connection to the vehicle bus and the mobile device.

An exemplary embodiment of data communication device 2 of the present invention is described with reference to FIGS. 1 and 2.

Data communication device 2 is permanently installed in vehicle 1. It is in particular integrated in a permanently installed radio. Data communication device 2 is thus developed in particular for data communication with other in-vehicle devices. For this purpose, it is coupled via interface 15 with CAN bus 4 of the vehicle, which in turn is connected to additional in-vehicle devices 5, 6 and 7. These additional in-vehicle devices 5, 6 and 7 may include sensors for example, which record operating data of the vehicle such as, for example, the current speed, the current fuel consumption and similar data. Furthermore, in-vehicle devices 5, 6 and 7 may be driver assistance systems such as a parking assistant, for example. Finally, in-vehicle devices 5, 6 and 7 may be multimedia or infotainment devices, which are provided in addition to the radio, which contains data communication device 2. The multimedia or infotainment devices, however, may also be contained in the radio. Data communication device 2 is furthermore coupled with a loudspeaker 3 for outputting audio data.

Furthermore, a mobile device 8 is situated in vehicle 1. This is, in particular, a mobile navigation device. Mobile device 8 is fastened via a mounting device 10 known per se on windshield 11 of the vehicle or on the dashboard. For the purpose of establishing a data link between mobile device 8 and data communication device 2 of vehicle 1, mobile device 8 has an interface 14. This is an asynchronous serial interface. Via this interface 14, mobile device 8 may be connected with interface 18 of data communication device 2 for example via a cable 9. Alternatively or additionally, interfaces 14 or 18 may also communicate with each other via a radio link such as for example a so-called Bluetooth or WLAN link. Mobile device 8 may furthermore include a display area 13 and a loudspeaker 19.

For the transmission of data from CAN bus 4 to mobile device 8, data communication device 2 has a filter device 16 for filtering the data received from CAN bus 4 and a converter 17 for converting the received data for transmission to mobile device 8. The function of filter device 16 and converter 17 will be explained later with reference to the exemplary embodiment of the method according to the present invention.

Finally, mobile device 8 may be coupled in a data link with another mobile device 12, for example via a radio link. Additional mobile device 12 may be a mobile telephone or a music playback device.

Figure 3:
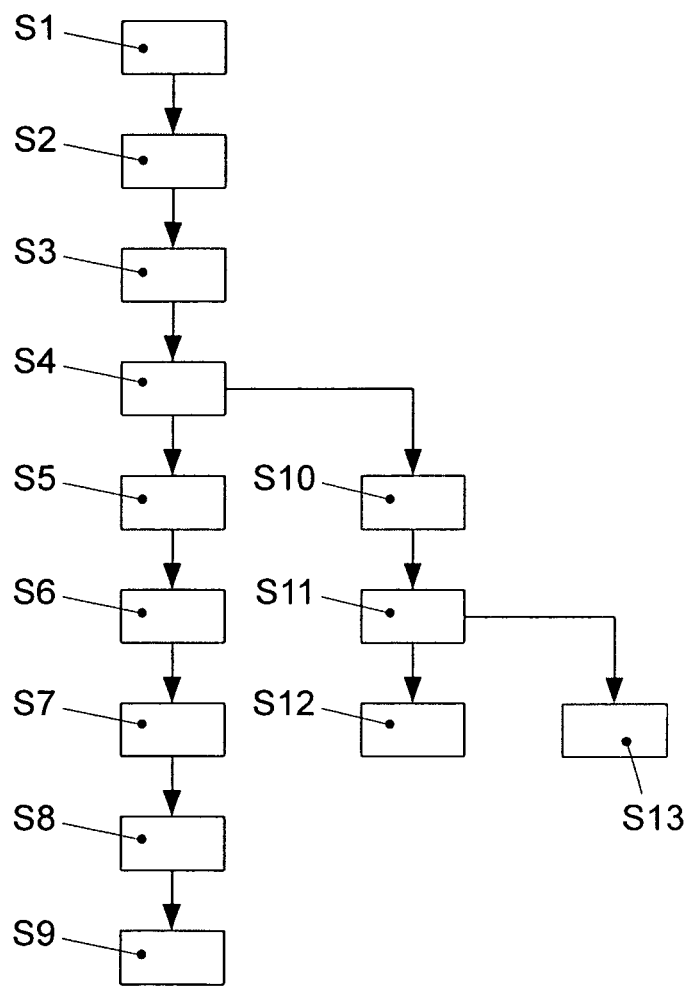
FIG. 3 schematically shows an exemplary embodiment of the method according to the present invention.

In the following, an exemplary embodiment of the method according to the present invention is explained with reference to FIG. 3.

The user is readily able to remove mobile device 8 manually from vehicle 1 and carry it along. The user is able to fasten it again physically to the vehicle by mounting device 10. Via interface 14, with the aid of cable 9 or a radio link, the user is able to couple mobile device 8 in step S1 in a data link to data communication device 2 of vehicle 1.

Subsequently, in step S2, authentication data are exchanged between data communication device 2 and mobile device 8. On the basis of these authentication data, mobile device 8 is able to ensure that the data received via interface 14 come from in-vehicle devices of vehicle 1. Conversely, data communication device 2 is able to identify mobile device 8 on the basis of the authentication data.

Specification data regarding the hardware and software versions of mobile device 8 and data communication device 2 as well as possible additional in-vehicle devices 5, 6, 7 are exchanged in step S3. This ensures the compatibility of applications using data communication device 2.

The authentication data and the specification data are verified in step S4. In the event of a successful verification, data communication is enabled over interfaces 14 and 18 between data communication device 2 and mobile device 8.

In step S5, data communication device 2 now checks via interface 15 whether data are supplied by CAN bus 4 that are to be transferred to mobile device 8. A first data protocol known per se is used for transmitting data via CAN bus 4. In this data protocol, the data to be transmitted are divided into data packets of a length of 8 bytes. Furthermore, an arbitration is performed. For data transmitted via CAN bus 4 are addressed such that there may be various senders that transmit data packets which may be received by various recipients. This is thus a kind of broadcast transmission. When various senders transmit data via the CAN bus, it is necessary to determine a sequence in which a potential recipient reads out the data. A prioritization is thus performed.

If it has been determined that there are relevant data for mobile device 8, then the data packets received from CAN bus 4 via interface 15 are filtered in filter device 16 such that only data relevant for mobile device 8 remain. This filtering occurs in step S6. In step S7, the filtered data packets are then converted by converter 17 for transmission to the mobile device. The limitation of the data packets to 8 bytes is lifted in the conversion. The data packets generated for transmission to mobile device 8 may be greater than 8 bytes. They will normally be smaller than 255 bytes, however.

The data link between data communication device 2 and mobile device 8 is a point-to-point connection. The data transmission thus does not occur by the broadcast method. Therefore, no arbitration is used in the data transmission. Converter 17 thus converts the data received from CAN bus 4 into a second data protocol, which does not use arbitration, which is not limited to a data packet size of 8 bytes and which provides a data format for asynchronous serial interface 14 of mobile device 8.

In step S8, the data are transmitted to mobile device 8 via interfaces 18 and 14 using this second data protocol. In step S9, mobile device 8 then processes the received data and, if applicable, produces acoustic and visual outputs.

After the link of mobile device 8 with data communication device 2 is enabled in step S4, data may also be transmitted in step S10 from mobile device 8 to data communication device 2 via interface 14 and interface 18. This data transmission also uses the second data protocol. In step S11, the data of the second data protocol are then converted in converter 17 into the data format of the first data protocol, which corresponds to the data format of CAN bus 4. In the process, the data packets are modified such that they comprise at most 8 bytes. Furthermore, an arbitration is performed. In step S12, these data are then transmitted to CAN bus 4. From there, they may be retrieved by in-vehicle devices 5, 6, 7. This retrieval of the data is supported by the arbitration. In addition, a prioritization relative to other data transmitted via CAN bus 4 is performed. Instead of transmitting the data to CAN bus 4, the data may also be prepared for acoustic output via loudspeaker 3 in step S13.

The data communication between mobile device 8 and data communication device 2 may be used for manifold applications. For example, the audio output may be controlled via the loudspeaker 19 of mobile device 8 and/or via in-vehicle loudspeaker 3. If the mobile device is a mobile navigation device, the audio output of the navigation device may occur not only via loudspeaker 19, but also via loudspeaker 3, which is controlled by data communication device 2 integrated in the radio. In this instance, data communication device 2 is able to interrupt the audio output of audio data, which are output for example by an in-vehicle music player, in order to output audio outputs of mobile navigation device 8. A display device of the radio receiver may additionally represent visually which audio outputs are currently active.

The data communication between data communication device 2 and mobile device 8 may furthermore be used for a display of a parking assistant. The data of the parking assistant formed by an in-vehicle device 5, 6, 7 are transmitted to data communication device 2 via CAN bus 4 in the first data protocol. There the data are filtered and converted and transmitted to mobile device 8, in which the image data are output on display area 13.

The data exchange between data communication device 2 and mobile device 8 may also include an exchange of operating data that make it possible for the radio containing data communication device 2 and/or other in-vehicle devices 5, 6, 7 to be operated using mobile device 8. Mobile device 8 has an input device for this purpose. Display area 13 may be developed as a touch screen, for example.

Conversely, the data communication between data communication device 2 and mobile device 8 may also be used to operate mobile device 8 via the operating elements of vehicle 1. The operating signals may be transmitted from corresponding operating elements via CAN bus 4 to data communication device 2 and converted there into operating signals for the asynchronous serial interface 14 of the mobile device such that mobile device 8 is able to process these operating signals once they have been transmitted to mobile device 8.

Another exemplary embodiment of the method of the present invention is described in the following.

In this second exemplary embodiment, converter 17 does not convert the first data protocol of CAN bus 4 directly into the second data protocol for the asynchronous serial interface.

Instead, a conversion into an intermediate data format is performed, e.g., between steps S8 and S9. The final conversion into the second data format occurs only within interface 14 of mobile device 8. The intermediate data format, which is output via interface 18 of data communication device 2, is characterized by the fact that no arbitration is performed. The intermediate data format, however, corresponds to the first data protocol to the extent that development tools may continue to be used with very small adjustments for simulation and error debugging of data transmitted via CAN bus 4.

LIST OF REFERENCE NUMERALS

1 vehicle
2 data communication device
3 loudspeaker
4 CAN bus
5 in-vehicle device
6 in-vehicle device
7 in-vehicle device
8 mobile device
9 cable
10 mounting device
11 windshield
12 additional mobile device
13 display area
14 interface
15 interface
16 filter device
17 converter
18 interface
19 loudspeaker

What is claimed is:

1. A method for data communication in a vehicle between an in-vehicle device and a mobile device coupled with the vehicle, the method comprising:

transmitting, by the in-vehicle device, data via a data bus of the vehicle to an in-vehicle data communication device, a first data protocol being used in which an arbitration occurs, filtering, by the data communication device, the data such that only data relevant to the mobile device remains;

converting, by the data communication device, the filtered data into a data format for an asynchronous serial interface, for transmission via a second data protocol in which no arbitration occurs, and transmitting, by the data communication device, the converted data via a data link to the mobile device, the second data protocol being used;

wherein, after a data link is established between the mobile device and the data communication device, specification data reflecting hardware and/or software of the mobile device is received by the data communication device, and specification data reflecting hardware and/or software of the data communication device and the in-vehicle device is transmitted to the mobile device, the specification data of the mobile device and the specification data of the data communication device and the in-vehicle device determining a compatibility of the hardware and/or software of the data communication device, the in vehicle device, and the mobile device.

2. The method according to claim 1, wherein the data link between the data communication device and the mobile device is a serial point-to-point connection.

3. The method according to claim 1, wherein the data in the second data protocol are transmitted in packets, a length of a data packet being greater than 8 bytes and smaller than 255 bytes.

4. The method according to claim 1, wherein in the data transmission from the data communication device to the mobile device, an authentication code is transmitted to the mobile device.

5. The method according to claim 1, further comprising:
encrypting the data transmission between the data communication device and the mobile device.

6. The method according to claim 1, further comprising:
receiving, by the data communication device, data from the mobile device according to the second protocol.

7. The method according to claim 6, wherein the data received by the data communication device from the mobile device is audio data.

8. The method according to claim 6, wherein the data received by the data communication device from the mobile device allows for control of audio output from the mobile device.

9. The method according to claim 6, wherein the data received by the data communication device from the mobile device allows for control of audio output from in-vehicle device.

10. The method according to claim 6, wherein the data received by the data communication device from the mobile device is specification information of the mobile device.

11. The method according to claim 1, further comprising:
transmitting audio data from the mobile device to the data communication device, and
acoustically outputting the audio data by the data communication device.

12. A method for data communication in a vehicle between an in-vehicle device and a mobile device coupled with the vehicle, the method comprising:
transmitting, by the in-vehicle device, data via a data bus of the vehicle to an in-vehicle data communication device, a first data protocol being used in which an arbitration occurs,
converting, by the data communication device, the data into a data format for an asynchronous serial interface, for transmission via a second data protocol in which no arbitration occurs, and
transmitting, by the data communication device, the converted data via a data link to the mobile device, the second data protocol being used;
wherein the data bus of the vehicle is a controller area network bus, the data communication device converts the data received via the controller area network bus into an intermediate data format, and the mobile device converts the data received from the data communication device into the data format for the asynchronous serial interface.

13. A method for data communication in a vehicle between an in-vehicle device and a mobile device coupled with the vehicle, the method comprising:
transmitting, by the in-vehicle device, data via a data bus of the vehicle to an in-vehicle data communication device, a first data protocol being used in which an arbitration occurs,
filtering, by the data communication device, the data such that only data relevant to the mobile device remains;
converting, by the data communication device, the filtered data into an intermediate data format, and
transmitting, by the data communication device, the converted data via a data link to the mobile device, an intermediate data protocol being used in which no arbitration occurs;
converting, by the mobile device, the data into a second data format, a second data protocol being used in which no arbitration occurs;
wherein, after a data link is established between the mobile device and the data communication device, specification data reflecting hardware and/or software of the mobile device is received by the data communication device, and specification data reflecting hardware and/or software of the data communication device and the in-vehicle device is transmitted to the mobile device, the specification data of the mobile device and the specification data of the data communication device and the in-vehicle device determining a compatibility of the hardware and/or software of the data communication device, the in vehicle device, and the mobile device.

14. A data communication device in a vehicle for data communication between an in-vehicle device and a mobile device coupled with the vehicle, comprising:
a first interface adapted for receiving data from the in-vehicle device via a data bus of the vehicle, a first data protocol being used in which an arbitration occurs,
a filter adapted for filtering the data such that only data relevant to the mobile device remains;
a converter adapted for converting the filtered data into a data format for an asynchronous serial interface, for transmission via a second data protocol in which no arbitration occurs, and
a second interface adapted for transmitting the converted data via a data link to the mobile device, the second data protocol being used;
wherein, after a data link is established between the mobile device and the data communication device, specification data reflecting hardware and/or software of the mobile device is received by the data communication device, and specification data reflecting hardware and/or software of the data communication device and the in-vehicle device is transmitted to the mobile device, the specification data of the mobile device and the specification data of the data communication device and the in-vehicle device determining a compatibility of the hardware and/or software of the data communication device, the in vehicle device, and the mobile device.

15. The data communication device according to claim 14, wherein the data communication device comprises a radio.

16. A data communication device in a vehicle for data communication between an in-vehicle device and a mobile device coupled with the vehicle, comprising:
a first interface adapted for receiving data from the in-vehicle device via a data bus of the vehicle, a first data protocol being used in which an arbitration occurs, a converter adapted for converting the data into a data format for an asynchronous serial interface, for transmission via a second data protocol in which no arbitration occurs, and a second interface adapted for transmitting the converted data via a data link to the mobile device, the second data protocol being used;

wherein the data bus of the vehicle is a controller area network bus, the converter converts the data received via the controller area network bus into an intermediate data format, and the mobile device converts the data received from the data communication device into the data format for the asynchronous serial interface.

\* \* \* \* \*